United States Patent
Li et al.

(10) Patent No.: US 10,992,144 B2
(45) Date of Patent: Apr. 27, 2021

(54) BATTERY BALANCING AND CURRENT CONTROL WITH BYPASS CIRCUIT FOR LOAD SWITCH

(71) Applicant: Galley Power LLC, Hudson, MA (US)

(72) Inventors: Peng Li, Bolton, MA (US); Liang Yan, Fremont, CA (US); Bradley M. Lehman, Belmont, MA (US)

(73) Assignee: Galley Power LLC, Hudson, MA (US)

( * ) Notice: Subject to any disclaimer, the term of this patent is extended or adjusted under 35 U.S.C. 154(b) by 179 days.

(21) Appl. No.: 15/982,137

(22) Filed: May 17, 2018

(65) Prior Publication Data

US 2018/0337536 A1 Nov. 22, 2018

Related U.S. Application Data

(60) Provisional application No. 62/507,764, filed on May 17, 2017.

(51) Int. Cl.
*H02J 7/00* (2006.01)
*H01M 10/42* (2006.01)
(Continued)

(52) U.S. Cl.
CPC ......... *H02J 7/0016* (2013.01); *H01M 10/425* (2013.01); *H01M 10/443* (2013.01);
(Continued)

(58) Field of Classification Search
CPC .............. H02J 7/0016; H02J 7/007194; H02J 7/007192; H02J 7/00718; H02J 7/0091; H01M 10/443; H01M 10/425
(Continued)

(56) References Cited

U.S. PATENT DOCUMENTS 3,585,482 A * 6/1971 Zelina .................... H02J 7/008
320/125
5,177,426 A * 1/1993 Nakanishi ............ H02J 7/0031
320/134
(Continued)

FOREIGN PATENT DOCUMENTS

KR 20070108754 A * 11/2007

OTHER PUBLICATIONS

"What are the advantages and disadvantages of transistor series voltage regulator?", SemiconductorForu.com, Published Online Jun. 27, 2017, Accessed Online Feb. 11, 2020, www.semiconductorforu.com/advantages-disadvantages-transistor-series-voltage-regulator/.*

(Continued)

*Primary Examiner* — John T Trischler
(74) *Attorney, Agent, or Firm* — Hamilton, Brook, Smith & Reynolds, P.C.

(57) ABSTRACT

A circuit provides for regulating charge and discharge current of a battery. A bypass circuit is connected to a terminal of the battery and connected in parallel with a load switch. The bypass circuit may selectively direct a bypass current around the load switch. A controller can operate in plural modes to control the bypass circuit. In a first mode, the controller controls one or more parameters of the bypass current based on values corresponding to a current at the terminal, a voltage at the terminal, and/or a temperature of the battery. In a second mode, the controller controls the bypass circuit to disable the bypass current.

32 Claims, 10 Drawing Sheets

(51) Int. Cl.
*H01M 10/44* (2006.01)
*H01M 10/48* (2006.01)
*H01M 10/63* (2014.01)

(52) U.S. Cl.
CPC .............. *H02J 7/00* (2013.01); *H02J 7/005* (2020.01); *H02J 7/0091* (2013.01); *H02J 7/00718* (2020.01); *H02J 7/007192* (2020.01); *H02J 7/007194* (2020.01); *H01M 10/486* (2013.01); *H01M 10/63* (2015.04); *H01M 2010/4271* (2013.01); *H02J 7/0048* (2020.01); *H02J 7/00304* (2020.01); *H02J 2207/20* (2020.01)

(58) Field of Classification Search
USPC .......................................................... 320/122
See application file for complete search history.

(56) References Cited

U.S. PATENT DOCUMENTS

| | | | | |
|---|---|---|---|---|
| 5,600,247 A * | 2/1997 | Matthews | ............. | H01M 10/48 324/426 |
| 5,675,233 A * | 10/1997 | Kaneko | ............... | H01M 10/441 320/122 |
| 5,767,659 A * | 6/1998 | Farley | ................... | H02J 7/0077 320/106 |
| 5,777,454 A * | 7/1998 | McAndrews | ......... | H02J 7/0022 307/66 |
| 5,825,155 A * | 10/1998 | Ito | ....................... | H02J 7/00036 320/118 |
| 5,850,136 A * | 12/1998 | Kaneko | ................. | H02J 7/0016 320/119 |
| 5,886,503 A * | 3/1999 | McAndrews | ......... | H02J 7/0022 320/121 |
| 5,903,131 A * | 5/1999 | Sekine | ............. | G01R 19/16542 320/106 |
| 5,932,990 A * | 8/1999 | Kaneko | ................. | H02J 7/0016 320/122 |
| 5,952,815 A * | 9/1999 | Rouillard | ............. | H02J 7/0021 320/116 |
| 6,060,864 A * | 5/2000 | Ito | ................... | G01R 19/16542 320/136 |
| 6,064,179 A * | 5/2000 | Ito | ........................ | H02J 7/0021 320/128 |
| 6,107,802 A * | 8/2000 | Matthews | ........... | H02J 7/00036 324/427 |
| 6,160,382 A * | 12/2000 | Yoon | .................... | G01R 31/389 320/136 |
| 6,208,147 B1 * | 3/2001 | Yoon | .................. | G01R 31/3842 324/430 |
| 6,229,282 B1 * | 5/2001 | Stadnick | ................ | H01M 2/34 257/665 |
| 6,271,646 B1 * | 8/2001 | Evers | ................... | H02J 7/0016 320/120 |
| 6,275,005 B1 * | 8/2001 | Stadnick | ................ | H01M 2/34 257/665 |
| 6,369,576 B1 * | 4/2002 | Matthews | ........ | G01R 19/16542 324/426 |
| 6,396,246 B2 * | 5/2002 | Haraguchi | ............ | H02J 7/0021 320/134 |
| 6,577,135 B1 * | 6/2003 | Matthews | ........... | H01M 10/425 324/426 |
| 6,700,351 B2 * | 3/2004 | Blair | ...................... | H02J 7/0026 320/125 |
| 7,065,152 B2 * | 6/2006 | Gottshall | .......... | H04L 12/40045 307/10.1 |
| 7,129,676 B2 * | 10/2006 | Hoff | ........................ | H02J 9/062 320/150 |
| 7,274,116 B2 * | 9/2007 | Inoue | .................... | H02J 7/0063 307/100 |
| 7,405,538 B1 * | 7/2008 | Hoff | ........................ | H02J 9/062 320/150 |
| 7,453,235 B2 * | 11/2008 | Blair | ...................... | H02J 9/062 320/116 |
| 7,557,538 B2 * | 7/2009 | Yau | ....................... | H02J 7/0016 320/116 |
| 7,557,539 B2 * | 7/2009 | Takagi | .................. | H02J 7/0016 320/116 |
| 7,573,235 B2 * | 8/2009 | Hand | ..................... | H02J 7/0016 320/122 |
| 7,615,969 B2 * | 11/2009 | Meng | .................... | H02J 7/0091 320/150 |
| 7,626,359 B2 * | 12/2009 | Imai | ....................... | H02J 7/0026 320/116 |
| 7,705,574 B2 * | 4/2010 | Fox | ......................... | G05F 1/569 323/268 |
| 7,745,025 B2 * | 6/2010 | Leach | .................... | H02J 7/0018 429/9 |
| 7,800,244 B2 * | 9/2010 | Treguer | ................ | H02J 7/1423 307/10.1 |
| 7,940,018 B2 * | 5/2011 | Yonemori | ................ | B60K 6/46 318/376 |
| 7,969,121 B2 * | 6/2011 | Smith | .................. | H02M 3/1584 320/167 |
| 8,134,256 B2 * | 3/2012 | Onishi | ................... | G08C 17/04 307/104 |
| 8,160,654 B2 * | 4/2012 | Onishi | ................... | H02J 7/025 455/572 |
| 8,174,242 B2 * | 5/2012 | Imai | ....................... | H02H 9/001 320/138 |
| 8,305,046 B2 * | 11/2012 | Brereton | ............... | H02J 7/0031 320/163 |
| 8,330,436 B2 * | 12/2012 | Oraw | ..................... | H02J 1/102 323/268 |
| 8,354,825 B2 * | 1/2013 | Lee | ....................... | H02J 7/0018 320/116 |
| 8,410,755 B2 * | 4/2013 | Chau | ..................... | B60L 3/0046 320/118 |
| 8,487,581 B2 * | 7/2013 | Tan | ....................... | G01R 31/386 320/103 |
| 8,541,981 B2 * | 9/2013 | Zhang | ................... | H02J 7/0026 320/134 |
| 8,723,480 B2 * | 5/2014 | Lim | ....................... | H02J 7/0019 320/118 |
| 8,779,722 B2 * | 7/2014 | Lee | ....................... | H02J 7/0016 320/118 |
| 8,853,995 B2 * | 10/2014 | Von Novak | ............. | H02J 7/025 320/103 |
| 8,901,890 B2 * | 12/2014 | Yamauchi | ............... | H02J 3/382 320/128 |
| 8,928,282 B2 * | 1/2015 | Kudo | .................. | H01M 10/425 320/118 |
| 8,947,052 B2 * | 2/2015 | Nishizawa | .......... | H01M 10/441 320/134 |
| 8,970,180 B2 * | 3/2015 | Li | ......................... | H02J 7/0027 320/155 |
| 9,077,186 B2 * | 7/2015 | Arakawa | ................ | H02J 7/0031 |
| 9,077,196 B2 * | 7/2015 | Sim | ....................... | H02J 7/0063 |
| 9,104,212 B2 * | 8/2015 | Wei | ...................... | H01M 10/425 |
| 9,130,377 B2 * | 9/2015 | Barsukov | ............... | H02J 7/0021 |
| 9,184,615 B2 * | 11/2015 | Kim | ...................... | H02J 7/0071 |
| 9,188,101 B2 * | 11/2015 | Sakakibara | ........... | F02N 11/087 |
| 9,190,855 B2 * | 11/2015 | White | ................... | H02J 7/0016 |
| 9,203,262 B2 * | 12/2015 | Yokoyama | ............... | H02J 7/35 |
| 9,209,637 B2 * | 12/2015 | Monden | ............... | H01M 10/443 |
| 9,211,800 B2 * | 12/2015 | Nishi | ................... | H02J 7/0016 |
| 9,225,190 B2 * | 12/2015 | Labbe | .................... | H02J 7/007 |
| 9,231,233 B2 * | 1/2016 | Hausberger | ............ | B60L 58/12 |
| 9,231,440 B2 * | 1/2016 | Son | ....................... | H02J 9/062 |
| 9,263,912 B2 * | 2/2016 | Verdun | .................. | H02J 7/007 |
| 9,368,991 B2 * | 6/2016 | Qahouq | ................ | H02J 7/0018 |
| 9,423,817 B2 * | 8/2016 | Sakakibara | ........... | H02M 3/158 |
| 9,465,077 B2 * | 10/2016 | Love | .................... | G01R 31/382 |
| 9,493,077 B2 * | 11/2016 | Yamasaki | ............... | B60L 50/53 |
| 9,496,749 B2 * | 11/2016 | Noda | ................... | H01M 10/425 |
| 9,502,909 B2 * | 11/2016 | El-Maleh | ............... | H02J 50/80 |
| 9,525,301 B2 * | 12/2016 | White | ................... | H02J 7/0016 |
| 9,548,669 B2 * | 1/2017 | Nystrom | ................ | H02M 1/36 |
| 9,587,878 B2 * | 3/2017 | Paydar | ................ | G07F 17/0092 |

(56) References Cited

U.S. PATENT DOCUMENTS

| | | | | |
|---|---|---|---|---|
| 9,608,458 B2* | 3/2017 | Maltsev | | H02J 7/0013 |
| 9,620,969 B2* | 4/2017 | Kobayashi | | H02J 7/0016 |
| 9,680,313 B2* | 6/2017 | Grilli | | H02J 50/20 |
| 9,709,444 B2* | 7/2017 | Nozawa | | G01K 3/10 |
| 9,711,962 B2* | 7/2017 | Andrea | | H02H 9/002 |
| 9,768,704 B2* | 9/2017 | Haj-Maharsi | | H02M 1/4233 |
| 9,786,937 B2* | 10/2017 | Choi | | H01M 8/0494 |
| 9,825,478 B2* | 11/2017 | Odaohhara | | H02J 7/00 |
| 9,831,700 B2* | 11/2017 | Verdun | | H02J 7/0069 |
| 9,893,385 B1* | 2/2018 | Nayar | | H01M 10/486 |
| 9,958,509 B2* | 5/2018 | Choi | | H02J 7/0068 |
| 9,979,211 B2* | 5/2018 | Barsukov | | H02J 7/0016 |
| 10,020,746 B2* | 7/2018 | Horii | | H02M 1/08 |
| 10,027,157 B2* | 7/2018 | Labbe | | G01K 13/00 |
| 10,033,204 B2* | 7/2018 | Huang | | H02J 7/0045 |
| 10,063,068 B1* | 8/2018 | McCormick | | H01M 10/486 |
| 10,090,698 B2* | 10/2018 | Melin | | H01M 10/443 |
| 10,170,929 B2* | 1/2019 | Shao | | H02J 7/345 |
| 10,355,582 B2* | 7/2019 | Braginsky | | H02M 7/44 |
| 10,393,818 B2* | 8/2019 | Din | | G01R 31/389 |
| 10,464,507 B2* | 11/2019 | Yang | | B60L 58/21 |
| 10,468,980 B2* | 11/2019 | Abu Qahouq | | H02M 3/158 |
| 10,536,007 B2* | 1/2020 | Beaston | | H02J 7/007 |
| 2001/0033502 A1* | 10/2001 | Blair | | H02J 9/062 363/65 |
| 2003/0160593 A1* | 8/2003 | Yau | | H02J 7/0018 320/116 |
| 2003/0232237 A1* | 12/2003 | Nakagawa | | H01M 10/441 429/61 |
| 2004/0135551 A1* | 7/2004 | Hoff | | H02J 9/062 320/150 |
| 2004/0160214 A1* | 8/2004 | Blair | | H02J 7/0022 320/118 |
| 2005/0083016 A1* | 4/2005 | Yau | | H02J 7/0016 320/116 |
| 2006/0006850 A1* | 1/2006 | Inoue | | H02J 2207/20 323/265 |
| 2006/0119322 A1* | 6/2006 | Maleki | | H02J 2207/20 320/150 |
| 2007/0075681 A1* | 4/2007 | Takagi | | H02J 7/0016 320/128 |
| 2007/0103118 A1* | 5/2007 | Takagi | | H02J 9/061 320/130 |
| 2007/0190369 A1* | 8/2007 | Leach | | H02J 7/0018 429/9 |
| 2008/0024089 A1* | 1/2008 | Meng | | H02J 7/0091 320/128 |
| 2008/0129219 A1* | 6/2008 | Smith | | H02M 3/1582 315/291 |
| 2008/0129249 A1* | 6/2008 | Ishishita | | G01R 35/00 320/136 |
| 2008/0169706 A1* | 7/2008 | Onishi | | H02J 7/025 307/104 |
| 2008/0191556 A1* | 8/2008 | Hong | | H02J 9/061 307/64 |
| 2009/0001932 A1* | 1/2009 | Kamijo | | H02J 5/005 320/108 |
| 2009/0051323 A1* | 2/2009 | Sato | | H02J 7/0031 320/134 |
| 2009/0102421 A1* | 4/2009 | Imai | | H02J 7/0014 320/118 |
| 2009/0251100 A1* | 10/2009 | Incledon | | H02J 7/0016 320/106 |
| 2009/0256526 A1* | 10/2009 | Imai | | H02H 9/001 320/135 |
| 2009/0309547 A1* | 12/2009 | Nakatsuji | | H01M 10/441 320/134 |
| 2010/0013321 A1* | 1/2010 | Onishi | | G08C 17/04 307/104 |
| 2010/0127663 A1* | 5/2010 | Furukawa | | B60L 3/04 320/134 |
| 2010/0171468 A1* | 7/2010 | Brereton | | H02J 7/0031 320/163 |
| 2010/0188051 A1* | 7/2010 | Yamazaki | | H02J 7/0072 320/148 |
| 2010/0207579 A1* | 8/2010 | Lee | | H02J 7/0018 320/120 |
| 2010/0213901 A1* | 8/2010 | Morimoto | | B60L 8/003 320/145 |
| 2010/0253281 A1* | 10/2010 | Li | | H02J 7/0027 320/108 |
| 2010/0315043 A1* | 12/2010 | Chau | | B60L 3/0046 320/134 |
| 2011/0031926 A1* | 2/2011 | Bhat | | H02J 7/0029 320/101 |
| 2011/0089898 A1* | 4/2011 | Lee | | H02J 7/0016 320/116 |
| 2011/0115432 A1* | 5/2011 | El-Maleh | | H02J 50/20 320/108 |
| 2011/0138609 A1* | 6/2011 | Cherukupalli | | H01L 31/1876 29/592.1 |
| 2011/0260687 A1* | 10/2011 | Kudo | | H01M 10/425 320/118 |
| 2011/0285352 A1* | 11/2011 | Lim | | H02J 7/0019 320/118 |
| 2012/0126820 A1* | 5/2012 | Tan | | G01R 31/386 324/434 |
| 2012/0203377 A1* | 8/2012 | Paydar | | F25D 29/008 700/232 |
| 2012/0206105 A1* | 8/2012 | Nishizawa | | H01M 10/441 320/134 |
| 2012/0217814 A1* | 8/2012 | Yokoyama | | H02J 7/35 307/84 |
| 2012/0274143 A1* | 11/2012 | Arakawa | | H02J 7/0031 307/80 |
| 2012/0319658 A1* | 12/2012 | White | | H02J 7/0016 320/134 |
| 2013/0063091 A1* | 3/2013 | Nishi | | H02J 7/0016 320/126 |
| 2013/0113430 A1* | 5/2013 | Kim | | H02J 7/0032 320/134 |
| 2013/0140886 A1* | 6/2013 | Bito | | H01M 10/482 307/10.7 |
| 2013/0141109 A1* | 6/2013 | Love | | G01R 31/382 324/430 |
| 2013/0164567 A1* | 6/2013 | Olsson | | H01M 10/488 429/7 |
| 2013/0181680 A1* | 7/2013 | Chau | | B60L 3/0046 320/134 |
| 2013/0221924 A1* | 8/2013 | Sim | | H02J 7/0063 320/112 |
| 2013/0244065 A1* | 9/2013 | Yamauchi | | H02J 7/0014 429/61 |
| 2013/0257062 A1* | 10/2013 | Sakakibara | | F02N 11/087 290/38 R |
| 2013/0278216 A1* | 10/2013 | Son | | H02J 9/062 320/112 |
| 2014/0009106 A1* | 1/2014 | Andrea | | H02H 9/002 320/107 |
| 2014/0015488 A1* | 1/2014 | Despesse | | H01M 10/486 320/122 |
| 2014/0016425 A1* | 1/2014 | Lee | | G05F 1/10 365/226 |
| 2014/0021923 A1* | 1/2014 | Uchida | | H02J 7/007 320/118 |
| 2014/0035357 A1* | 2/2014 | Hausmann | | B60L 58/16 307/9.1 |
| 2014/0043007 A1* | 2/2014 | Wei | | H02J 7/0031 323/299 |
| 2014/0062387 A1* | 3/2014 | Kim | | H02J 7/0071 320/107 |
| 2014/0070761 A1* | 3/2014 | Labbe | | A61N 1/3787 320/108 |
| 2014/0077752 A1* | 3/2014 | Barsukov | | H02J 7/0021 320/103 |
| 2014/0125284 A1* | 5/2014 | Qahouq | | H02J 2207/20 320/118 |
| 2014/0172158 A1* | 6/2014 | Paradissis | | G06F 19/3462 700/232 |

(56) References Cited

U.S. PATENT DOCUMENTS

| | | | | |
|---|---|---|---|---|
| 2014/0217958 | A1* | 8/2014 | Verdun | H02J 7/0069 320/107 |
| 2014/0252847 | A1* | 9/2014 | Yang | B60L 3/0046 307/9.1 |
| 2014/0306666 | A1* | 10/2014 | Choi | H02J 7/0016 320/134 |
| 2015/0037656 | A1* | 2/2015 | Noda | H01M 10/441 429/149 |
| 2015/0214757 | A1* | 7/2015 | Zane | H02J 7/0021 320/107 |
| 2015/0311738 | A1* | 10/2015 | Odaohhara | H02J 7/00 320/128 |
| 2015/0357843 | A1* | 12/2015 | Kobayashi | H02J 7/0016 320/118 |
| 2015/0378415 | A1* | 12/2015 | George | G06F 1/30 307/64 |
| 2016/0006061 | A1* | 1/2016 | Choi | H01M 8/0494 307/20 |
| 2016/0016483 | A1* | 1/2016 | Yasunori | B60L 15/2009 320/162 |
| 2016/0056667 | A1* | 2/2016 | Konishi | H02J 9/062 307/66 |
| 2016/0064963 | A1* | 3/2016 | Huang | H02J 2207/40 320/114 |
| 2016/0064965 | A1* | 3/2016 | White | H02J 7/0016 320/134 |
| 2016/0072316 | A1* | 3/2016 | Barsukov | H02J 7/0016 320/112 |
| 2016/0082849 | A1* | 3/2016 | Yamasaki | H02J 7/00 290/3 |
| 2016/0118830 | A1* | 4/2016 | Jeon | B60L 58/22 320/127 |
| 2016/0118842 | A1* | 4/2016 | Labbe | A61N 1/3787 320/150 |
| 2016/0126762 | A1* | 5/2016 | Verdun | H02J 7/007 320/162 |
| 2016/0155278 | A1* | 6/2016 | Nozawa | B60W 20/50 701/22 |
| 2016/0176308 | A1* | 6/2016 | Morikawa | B60L 58/12 320/134 |
| 2016/0276848 | A1* | 9/2016 | Maltsev | H02J 7/0047 |
| 2016/0329607 | A1* | 11/2016 | Miyao | H01M 10/625 |
| 2016/0336623 | A1* | 11/2016 | Nayar | H01M 4/44 |
| 2016/0349331 | A1* | 12/2016 | Choi | H02J 7/0047 |
| 2017/0160348 | A1* | 6/2017 | Din | G01R 31/389 |
| 2017/0201091 | A1* | 7/2017 | Shao | H02J 7/345 |
| 2017/0201109 | A1* | 7/2017 | Meacham, II | H02J 7/0029 |
| 2017/0271863 | A1* | 9/2017 | Andrea | H02H 9/002 |
| 2017/0271864 | A1* | 9/2017 | Andrea | H02H 9/002 |
| 2017/0271865 | A1* | 9/2017 | Andrea | H02H 9/002 |
| 2017/0299650 | A1* | 10/2017 | Coyne | G01R 31/2874 |
| 2017/0345101 | A1* | 11/2017 | Beaston | G06Q 40/08 |
| 2018/0006555 | A1* | 1/2018 | Abu Qahouq | H02M 3/155 |
| 2018/0059191 | A1* | 3/2018 | Abu Qahouq | G01R 31/392 |
| 2018/0123357 | A1* | 5/2018 | Beaston | H02J 3/383 |
| 2018/0145517 | A1* | 5/2018 | Krishna | H02J 7/008 |
| 2018/0183254 | A1* | 6/2018 | Park | G06F 3/01 |
| 2018/0183261 | A1* | 6/2018 | Kwak | H02J 7/0091 |
| 2018/0191037 | A1* | 7/2018 | Oh | H01M 10/482 |
| 2018/0191172 | A1* | 7/2018 | Melin | H01M 10/443 |
| 2018/0205240 | A1* | 7/2018 | Sadilek | H02M 7/217 |
| 2018/0226810 | A1* | 8/2018 | Barsukov | H02J 7/0021 |
| 2018/0228007 | A1* | 8/2018 | Siefer | H02J 7/0068 |
| 2018/0254658 | A1* | 9/2018 | Koerner | H02J 7/345 |
| 2018/0287484 | A1* | 10/2018 | Braginsky | H02M 7/44 |
| 2018/0337532 | A1* | 11/2018 | Abu Qahouq | H02J 3/06 |
| 2019/0028017 | A1* | 1/2019 | Wataru | H02J 7/00 |
| 2019/0115632 | A1* | 4/2019 | Beuning | H01M 10/443 |
| 2019/0187216 | A1* | 6/2019 | Moote | H01M 10/613 |
| 2019/0214837 | A1* | 7/2019 | Kristjansson | H01M 10/44 |
| 2019/0273228 | A1* | 9/2019 | Takahashi | H02J 7/0003 |

OTHER PUBLICATIONS

"Heat Transfer and Thermal Stress in a Lithium Ion Battery", Wei Wu, Xinran Xiao, & Danghe Shi, Proceedings of the ASME 2010 International Mechanical Engineering Congress and Exposition, IMECE2010-37870, Nov. 12-18, 2010, pp. 343-351,Published Online Apr. 30, 2012, Accessed Online Jun. 1, 2020, https://asmedigitalcollect.*

Baronti,et al., "Investigation of series-parallel connections of multi-module batteries for electrified vehicles," Electric Vehicle Conference (IEVC), 2014 IEEE International, pp. 1-7, 17-19 (Dec. 2014).

Barre, et al. "A review on lithium-ion battery ageing mechanisms and estimations for automotive applications," Journal of Power Sources, 241, pp. 680-689, (2013).

Byrne, et al. "Behaviour of systems mixing parallel strings of lithium-ion and lead-acid batteries for telecommunications applications," in 27th International Telecommunication Energy Conference, Sep. 18, 2005-Sep. 22, 2005, Berlin, Germany, pp. 211-216, (2005).

Hafen, et al., "Nickel-hydrogen load sharing test for RNH-90-9 and RNH-76-3 cells," in Proceedings of the 1997 32nd Intersociety Energy Conversion Engineering Conference. Part 1 (of 4), Jul. 27, 1997-Aug. 1, 1997, Honolulu, HI, USA, pp. 180-185, (1997).

Han-Sik Ban, et al., "Load sharing improvement in parallel operated lead acid batteries," in ISIE 2001. 2001 IEEE International Symposium on Industrial Electronics Proceedings, Jun. 12-16, 2001, Piscataway, NJ, USA, pp. 1026-1031, (2001).

Howey, et al., "Online Measurement of Battery Impedance Using Motor Controller Excitation", IEEE Transactions on Vehicular Technology, vol. 63, pp. 2557-2566, (Jul. 2014).

Hsu, et al., "Increased energy delivery for parallel battery packs with no regulated bus," in 2012 IEEE International Telecommunications Energy Conference (INTELEC 2012), Sep. 30-Oct. 4, 2012, Piscataway, NJ, USA, p. 8, (2012).

Hsu, "Increased Energy Delivery for Parallel Battery Packs with No Regulated Bus," Ph.D. thesis, (Mar. 2014).

Huang, et al., "An Online Battery Impedance Measurement Method Using DC-DC Power Converter Control", Ieee Transactions on Industrial Electronics, vol. 61, pp. 5987-5995, (Nov. 2014).

Khaligh et al., "Battery, Ultracapacitor, Fuel Cell, and Hybrid Energy Storage Systems for Electric, Hybrid Electric, Fuel Cell, and Plug-In Hybrid Electric Vehicles: State of the Art," Vehicular Technology, IEEE Transactions on, vol. 59, pp. 2806-2814, (2010).

Lu, et al., "A review on the key issues for lithium-ion battery management in electric vehicles," Journal of Power Sources, 226, pp. 272-288, (2013).

Moo, et al., "Parallel Operation of Battery Power Modules," IEEE Transactions on Energy Conversion, vol. 23, Issue 2, pp. 701-707, (Jun. 2008).

Ramadesigan, et al., "Modeling and Simulation of Lithium-Ion Batteries from a Systems Engineering Perspective," Journal of the Electrochemical Society, 159 (3) R31-R45 (2012).

Sheng, et al., "Energy management for solar battery charging station," IEEE COMPEL (2013).

Sheng, et al., "Optimal power flow management in a photovoltaic nanogrid with batteries," IEEE Energy Conversion Congress and Exposition, 20-24, pp. 4222-4228, (Sep. 2015).

Tara, et al., "Battery Storage Sizing in a Retrofitted Plug-in Hybrid Electric Vehicle," Vehicular Technology, IEEE Transactions on, vol. 59, pp. 2786-2794, (2010).

Vetter, et al., "Ageing mechanisms in lithium-ion batteries," Journal of Power Sources, 147, pp. 269-281, (2005).

Wenzl, et al., "Life prediction of batteries for selecting the technically most suitable and cost effective battery," Journal of Power Soruces 144(2):373-384, (2005).

Wu, et al., "Numerical simulation for the discharge behaviors of batteries in series and/or parallel-connected battery pack," Electrochimica Acta, vol. 52, Issue 3, pp. 1349-1357, (Nov. 12, 2006).

* cited by examiner

BATTERY BALANCING AND CURRENT CONTROL WITH BYPASS CIRCUIT FOR LOAD SWITCH

RELATED APPLICATION

This application claims the benefit of U.S. Provisional Application No. 62/507,764, filed on May 17, 2017. The entire teachings of the above application are incorporated herein by reference.

BACKGROUND

Batteries are widely used to power various loads, and a range of battery chemistries can be implemented in applications depending on considerations such as safety, performance, stability, or cost. Configuring multiple batteries to a common load is a way to increase power capability. However, when batteries with different properties are coupled to a common load, the charging/discharging stress may not be distributed evenly, and optimal battery performance may not be achieved. Circulating current flowing among batteries at different SOCs or voltages can occur, and can result in over-charging, over-discharging, early failure of the batteries.

Typical batteries include a battery management system (BMS) to control balancing of multiple battery cells. The BMS controls charging and discharging of the battery cells in order to maintain the battery cells at a common voltage or state of charge.

SUMMARY

Example embodiments include a circuit for regulating charge and discharge current of a battery. The circuit may include a bypass circuit and a controller. The bypass circuit may be connected to a terminal of the battery and connected in parallel with a load switch. The bypass circuit may be configured to selectively direct a bypass current around the load switch. The controller may be configured to operate in plural modes to control the bypass circuit. In a first mode, the controller may control one or more parameters of the bypass current based on values corresponding to at least one of a current at the terminal, a voltage at the terminal, and a corresponding temperature of the battery. In a second mode, the controller may control the bypass circuit to disable the bypass current.

In further embodiments, the bypass current may be less than a current passed by the load switch in an on state. The load switch may be off in the first mode, and may be on in the second mode. The bypass circuit may include a bidirectional converter configured to pass the bypass current. The bidirectional converter includes at least one of a buck-boost converter, a boost-buck converter, a buck converter, a boost converter, and a dual-active bridge (DAB) converter.

In the first mode, the controller may control the bypass current based on the corresponding temperature or a difference between the corresponding temperature and a temperature of at least one additional battery. The controller, in the first mode, may control the bypass circuit to convert the discharge current to an output current having a higher voltage and a lower current. During charging of the battery in the first mode, the controller may lower the bypass current in response to the corresponding temperature of the battery passing a threshold. The controller may switch between the first and second modes based on a state of the load switch.

The controller may control the bypass current based on a received command signal indicating an operational profile, where the operational profile may indicate a discharge current, discharge voltage, charging current, and a threshold battery temperature. The controller may also control the bypass current based on a status signal, where the status signal indicates temperature, current, capacity, impedance and/or voltage of another battery.

The controller may be further configured to inject a perturbation signal into the bypass current, where the perturbation signal alters the bypass current in a manner indicating impedance of the battery. The controller may also calculate impedance of the battery based on a change in at least one of voltage and current at the terminal.

The parameters of the bypass current controlled by the controller may include a magnitude and/or a frequency of the bypass current. The bypass circuit may be connected to the terminal of the battery via at least one intermediary circuit elements. In the second mode, the bypass circuit may direct a leakage current around the load switch, the leakage current having a magnitude less than a magnitude of the bypass current. The controller may be further configured to receive at least one of a detected current at the terminal, a detected voltage at the terminal, and a detected temperature of the battery.

Further embodiments include a battery system. A plurality of cells may be coupled to a first terminal and a second terminal. A load switch may be coupled to the first terminal. A bypass circuit may be coupled to the first terminal and in parallel with the load switch, where the bypass circuit may be configured to direct a bypass current around the load switch. A controller is configured to selectively enable the bypass current. The system may also include a plurality of cell balancing circuits, where each of the plurality of cell balancing circuits may be coupled to a respective one of the plurality of cells and configured to selectively discharge the respective cell based on a command from the controller. The controller may be further configured to operate in plural modes. In a first mode, the controller may control the bypass current based on at least one of a discharge current detected at the terminal, a charge current at the terminal, a voltage at the terminal, and a corresponding temperature of the battery. In a second mode, the controller may control the bypass circuit to disable the bypass current.

Further embodiments may include a battery management system. A first bypass circuit may be configured to be coupled to a terminal of a first battery and in parallel with a first load switch, where the first bypass circuit may be configured to selectively direct a first bypass current around the first load switch. A second bypass circuit may be configured to be coupled to a terminal of a second battery and in parallel with a second load switch, where the second bypass circuit may be configured to selectively direct a second bypass current around the second load switch. A controller may be configured to selectively enable the first and second bypass currents based on a status of at least one of the first and second batteries. The battery system can include more than two batteries with same bypass circuit configurations as described here.

In further embodiments of a battery management system, the status may include a discharge current, a charge current, a voltage, an output impedance, and a corresponding temperature. During a discharge of the first and second batteries, the controller may be configured to control the first bypass current based on a difference between detected output impedances of the first and second batteries. During the discharge, the controller may be configured to control the first bypass current based on a difference between corresponding temperatures of the first and second batteries.

The controller may selectively enable the first bypass current in response to an indication of a difference in capacity between the first and second batteries. The controller may selectively enable the first bypass current based on information about at least one of the first and second batteries. The information may include a model number, cell chemical composition, a date of manufacture, and/or a number of charge and discharge cycles. The controller may be further configured to inject respective perturbation signals into the bypass current, where the perturbation signals alter the first and second bypass currents in a manner indicating impedance of the first and second batteries. The controller may control the respective perturbation signals to cancel out one another at a combined battery output. The first and second bypass circuits may be communicatively coupled to the controller via a controller area network (CAN) bus.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows.

Figure 1:
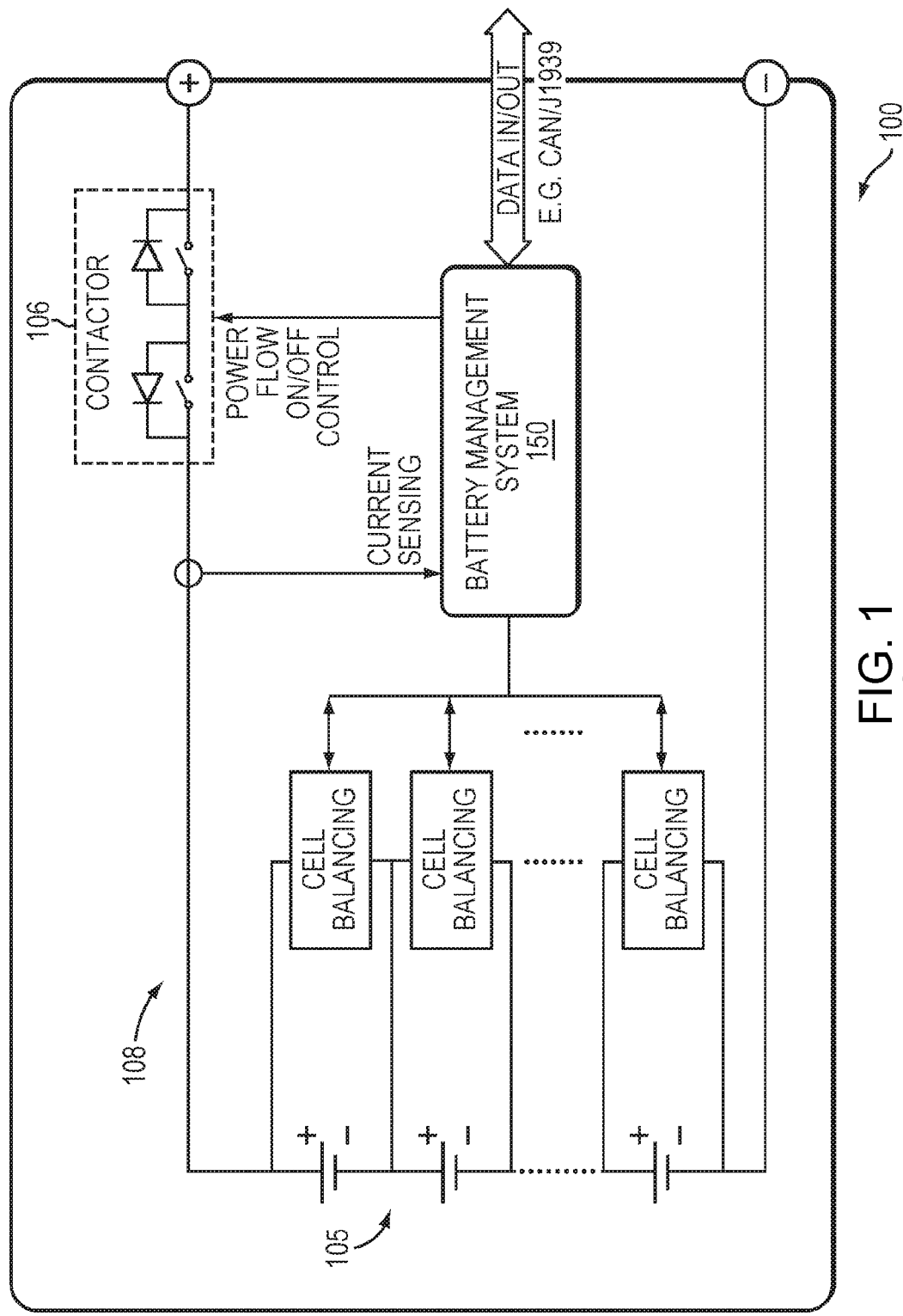
FIG. 1 is a diagram of a prior art battery including a battery management system.

FIG. 1 illustrates a typical prior-art battery 100 including a battery management system (BMS) 150. The battery 100 includes one or a plurality of battery cells 105 connected in series to an output terminal pair, as well as one or a plurality of cell balancing circuits 108 each connected in parallel to a respective one of the battery cells 105. A load switch 106 is connected between the batteries 105 and the output terminal, and provides binary (on/off) control of the charge/discharge current of the battery 100. The BMS 150 enables and disables the load switch 106 to control charging and discharging of the battery 100. To prevent unsafe operation (e.g., excessive charge or discharge current), the BMS 150 turns off the load switch 106 in response to detecting a battery current above a safe threshold. The BMS 150 also controls the cell balancing circuits 108 to perform cell balancing, thereby maintaining the battery cells 105 at a common voltage or state of charge.

A typical battery, such as a battery having a 6T form factor, can be configured comparably to the battery 100 of FIG. 1. In many applications, it is advantageous to replace older or aging batteries (particularly batteries implementing inferior cell chemistries) with newer batteries or batteries implementing superior cell chemistries. For example, 24V Lithium-ion 6T batteries are candidates as the drop-in replacement for existing 12V 6T absorbent glass mat (AGM) batteries due to their benefits, including long lifetime, high energy density, light weight and low cost of ownership. However, various chemistries are used for the 6T Lithium-ion batteries depending on the considerations such as safety, performance, stability, and cost.

TABLE 1

Typical properties of Lithium-ion battery chemistry.

| Battery Chemistry | Nominal Voltage(V) | Energy Density (Wh/kg) | Cycle Life (cycles) |
|---|---|---|---|
| NCA | 3.6 | 100~150 | 2000~3000 |
| LFP | 3.3 | 90~115 | >3000 |
| LCO | 3.7 | 100~190 | 500~1000 |
| NMC | 3.6 | 100~170 | 2000~3000 |
| LTO | 2.2 | 60~75 | >5000 |
| LMO | 3.8 | 100~120 | 1000 |

As shown in Table 1 above, the Lithium-ion chemistries have different properties, and the batteries demonstrate different characteristics on voltage, ampere hour (Ah) rating, C-rate performance, life cycles, ageing behaviors, etc. When batteries with different properties (e.g., chemistries) are coupled to a common load, the charging/discharging stress may not be distributed evenly, and optimal battery performance may not be achieved. Circulating current flowing among batteries at different SOCs or voltages can occur, and can result in over-charging, over-discharging, early failure of the batteries. Further, for batteries with the same chemistry, due to parameters tolerance, similar performance degradation also applies.

Therefore, a solution is needed to ensure a power source operates optimally when component batteries with the same chemistry and different chemistries, such as different Lithium-ion 6T batteries, are paralleled.

Figure 2:
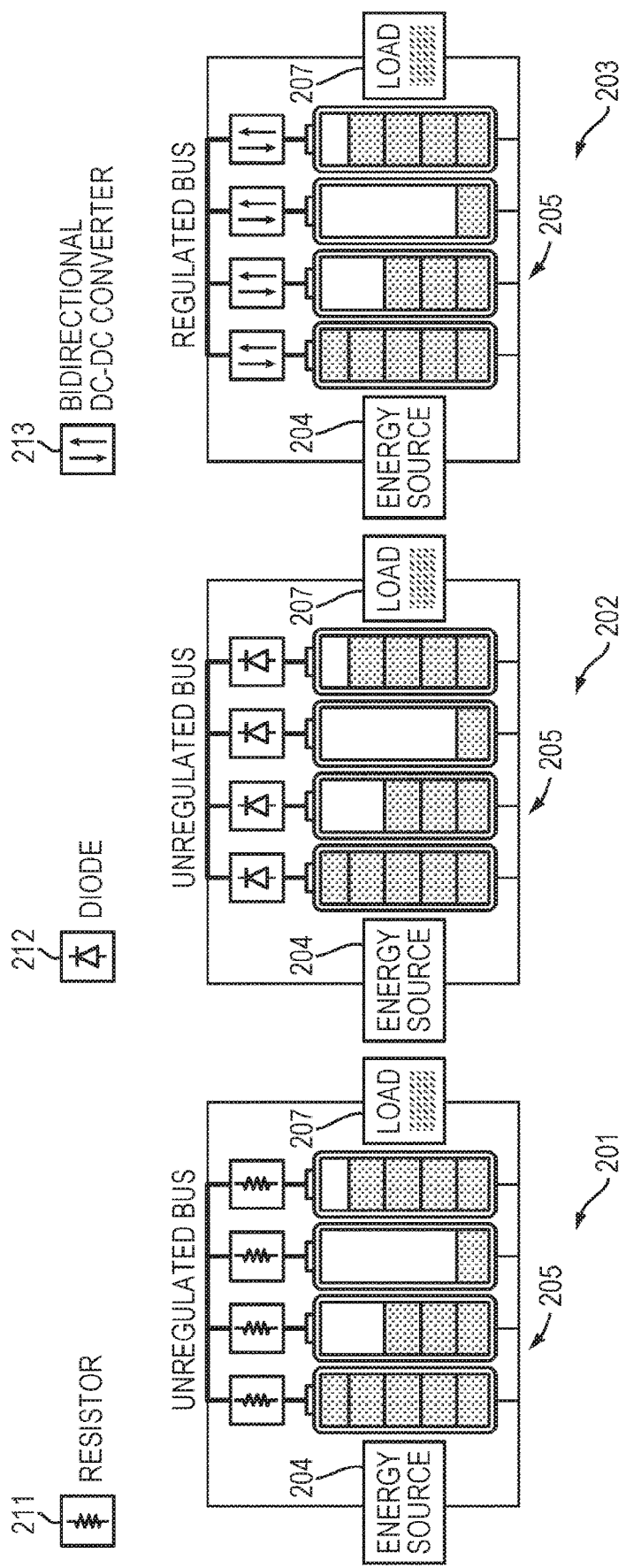
FIG. 2 is a diagram illustrating parallel battery configurations in the prior art.

FIG. 2 illustrates prior art circuits 201, 202, 203 having parallel battery configurations. Each of the circuits 201, 202, 203 includes plural batteries 205 connected in parallel between an energy source 204 and a load 207. Each of the circuits 201, 202, 203 also includes a circuit element in series with each of the batteries 205 without a load switch: the circuit 201 includes resistors 211, the circuit 202 includes diodes 212, and the circuit 203 includes DC-DC converters 213. The resistors 211 and the diodes 212 can contribute to limiting the battery imbalance and circulating current. However, the power loss associated with the resistors 211 and diodes 213 render the circuits 201, 202 impractical in many applications.

In the circuit 203, the DC-DC converters 213 can contribute to providing a stable output voltage at the power bus despite voltage or state of charge (SOC) differences among the batteries 205. However, the circuit 203 alone may be ineffective or impractical in many applications. For example, in applications of a 6T format battery, a DC-DC converter meeting the peak power requirement (1100 A) will be too large to fit into the 6T form factor. The power loss resulting from the DC-DC converters would be large when a high charging and discharging current passes through the converter. Further, the DC-DC converter operation does not consider individual battery cell performance and ageing, and therefore cannot ensure the optimal operation of each battery.

For battery protection under conditions including over-current, over-discharge, over-charge, a load switch is typically used for on/off control of the current. However, the load switch is not able to provide the optimum balancing current. The more sophisticated method uses a DC-DC converter to regulate the charging and/or discharging current. Ideally, the DC-DC converter can provide optimum balancing current. But the issue in many applications is that there could be substantially high pulsing current load which requires over-design of the DC-DC converter. This leads to high cost and impractical size DC-DC converter. Therefore, a better solution is needed to provide the optimum battery balancing current at low cost and small size and can support high pulsing current load.

Example embodiments provide improved performance of batteries during charging and discharging operation. When implemented in multiple battery configurations, example embodiments can also optimize charging and discharging of each battery based on the properties of the battery as well as the properties of the other batteries in the assembly.

Figure 3B:
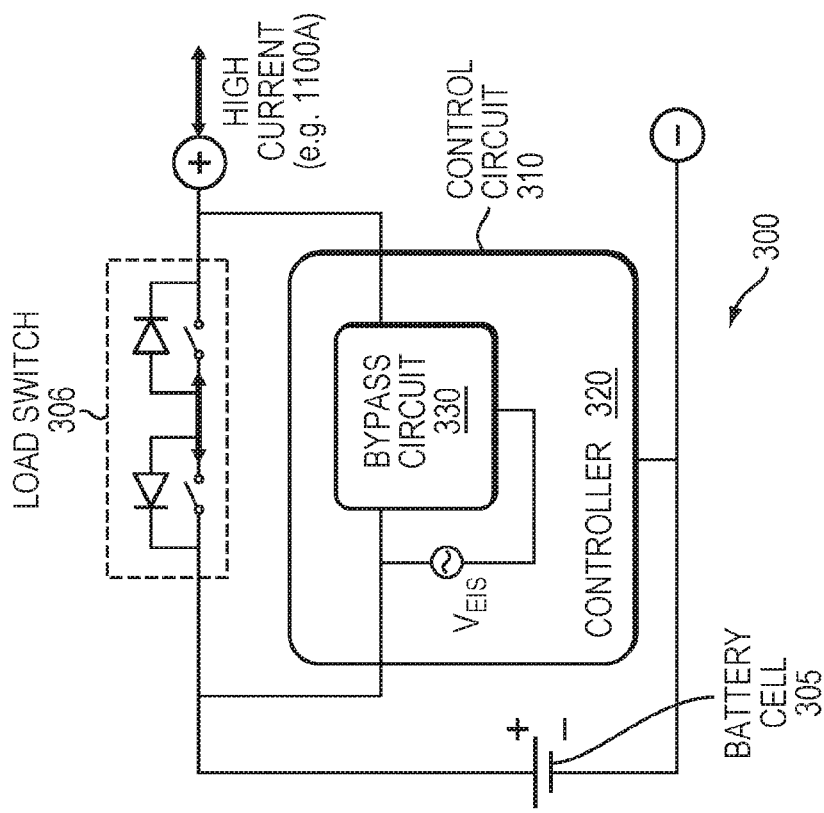
FIGS. 3A-B illustrate a circuit for controlling a battery current in one embodiment.
Figure 3A:
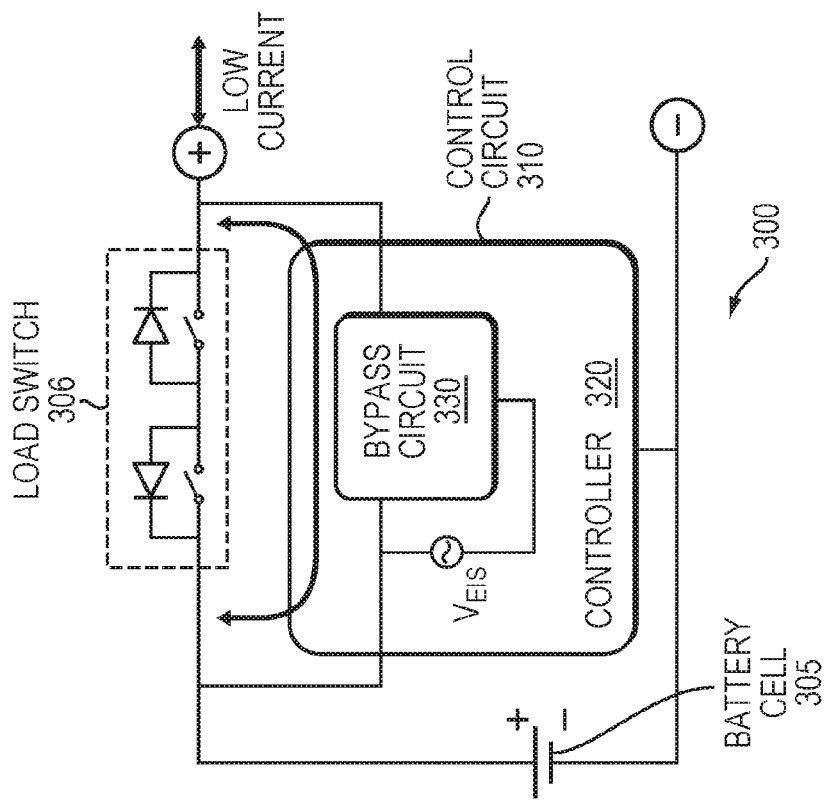

FIGS. 3A-B illustrate a control circuit 310 for controlling a battery 300 in one embodiment. The control circuit 310 may be integrated with the battery 300 (e.g., included as a component of a BMS (not shown)), or may be connected to the battery 305 as a standalone device. The control circuit 310 includes a bypass circuit 330 and a controller 320 and load switch 306 if load switch is not available in existing battery setup. In example embodiments, the controller 320 may include a buck-boost bi-directional power train, where the bypass circuit 330 includes a bidirectional converter such as a buck-boost converter, a boost-buck converter, a buck converter, a boost converter, or a dual-active bridge (DAB) converter. The bypass circuit 330 is connected to a terminal of a battery 305 (directly or via one or more intermediary circuit elements) and is connected in parallel with a load switch 306. By selectively passing current between the battery 305 and an output terminal, the bypass circuit 330 can selectively direct a bypass current around the load switch. Alternatively, a plurality of battery cells connected in series or parallel may be implemented in place of the battery cell 305.

The controller 320 may be configured to operate in plural modes to control the bypass circuit 330. In a first mode shown in FIG. 3A, the load switch 306 is in an off state, and the controller 320 controls one or more parameters of the bypass current based on a state of the battery 305 and/or a state of one or more other batteries (not shown) that make up a common power source. For example, the controller may receive, measure, or calculate values indicating current at the battery terminal (e.g., charge current or discharge current), a voltage and/or impedance of the battery, and/or a temperature of the battery. Based on some or all of those values, the controller 320 may control the bypass circuit to direct a bypass current around the load switch 306. The bypass circuit 330 may control the bypass current by controlling parameters of the current such as magnitude (of a DC current) or frequency/period (of an oscillating or pulse-width modulated (PWM) signal). As a result, the bypass circuit 330 can pass a controlled charge or discharge current when the load switch 306 is off. For example, when a low charge or discharge current is required (e.g., to reduce battery temperature, or to balance operation with other batteries), the bypass circuit 330 can pass a bypass current that is low relative to the current that is passed by the load switch 306 in a on state. The bypass current can also be varied dependent on its application and/or the observed battery states described above. By providing a controlled bypass current, the control circuit 310 can provide a variable-current alternative to the binary states provided by the load switch 306. Example applications of the bypass current, as well as corresponding operation of a control circuit, are described in further detail below.

The controller 320 may also control the bypass circuit 330 to convert a discharge current to an output current having a higher voltage and a lower current. As a result, battery 300 can be operable in some applications requiring a higher voltage power source without the need for additional batteries.

In a second mode shown in FIG. 3B, the load switch 306 is in an on state, and the controller 320 controls the bypass circuit 310 to disable the bypass current. The bypass circuit 330 may pass a relatively small ("leakage") current in this mode, while the load switch 306 passes a relatively high current for charging and/or discharging the battery 305. During a charge or discharge operation, the battery 300 may enter this mode when higher current is permitted and observed battery conditions do not necessitate a lower, controlled bypass current. The battery 300 may also enter an off state (not shown) where both the load switch 306 is off and the bypass current is disabled.

Figure 4:
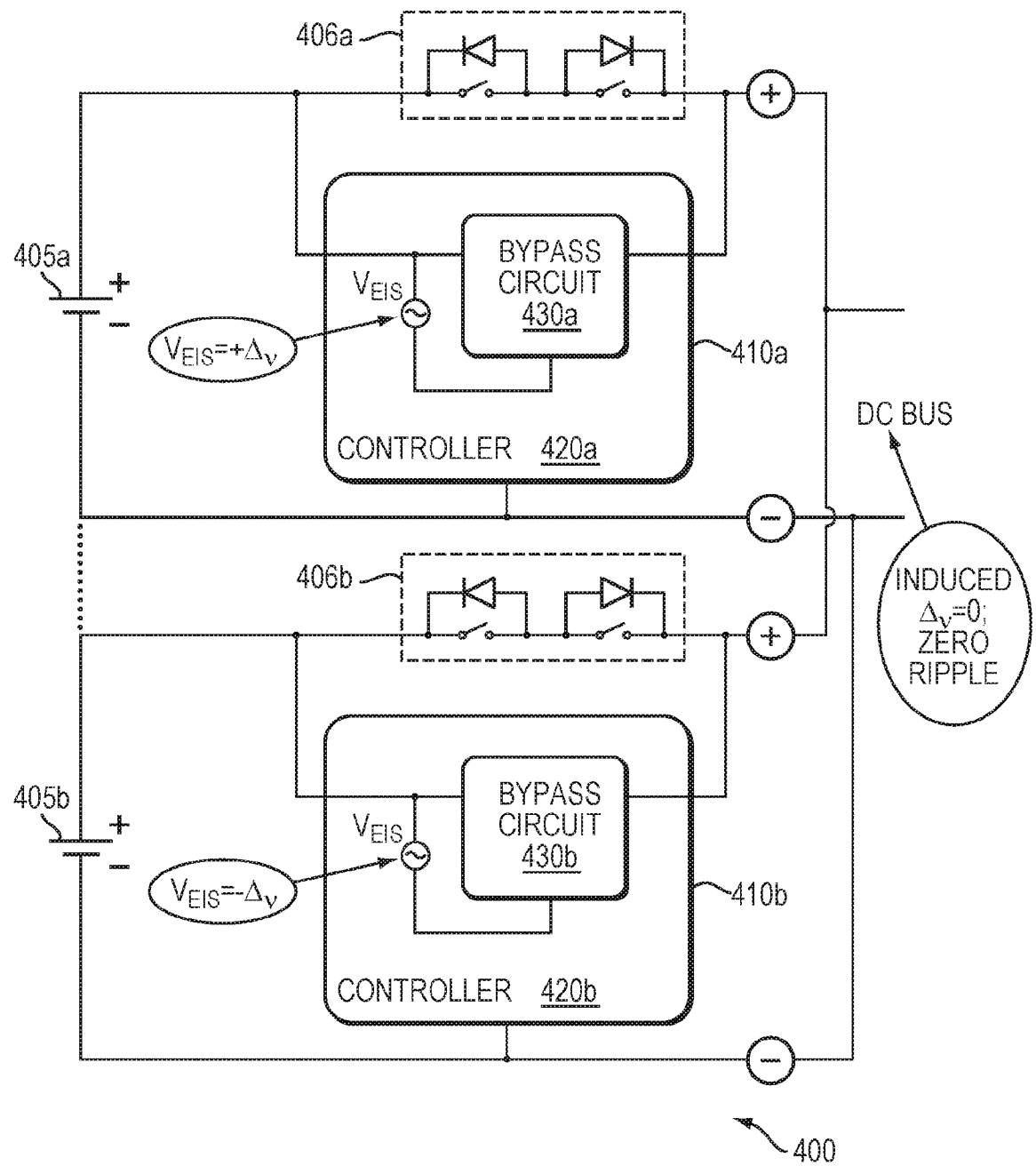
FIG. 4 illustrates a multi-battery power source in one embodiment.

FIG. 4 illustrates a multi-battery power source 400 in a further embodiment. The power source 400 may include two or more batteries (two of which are shown) coupled in parallel to a common power bus. Each of the batteries 405a-b may be configured comparably to the battery 300 described above, including a respective control circuit 410a-b having a controller 420a-b and a bypass circuit 430a-b connected in parallel with a load switch 406a-b. In a first mode of operation wherein a respective load switch 406a-b is off, one or more of the controllers 420a-b may control respective bypass currents as described above.

Further, the controllers 420a-b may control the bypass currents based on information about other batteries in the power source 400 other than the battery to which it is connected. For example, the controllers 420a-b may control the bypass current based on the temperature of the connected battery (e.g., a detected temperature or a value corresponding to the temperature), or a difference between the corresponding temperature and a temperature of at least one additional battery. Specifically, a hotter battery may be controlled to exhibit a lower bypass current for charging or discharging, and a cooler battery may be controlled to exhibit a higher current via the bypass circuit 430a-b or the load switch 406a-b. Each controller 420a-b may also adjust the bypass current over time in response to changing temperatures of the corresponding battery and/or other batteries, for example when those battery temperatures surpass or fall below predetermined thresholds. As a result, the power source 400 can provide a desired current at the power bus while preventing each of the batteries 405a-b from overheating.

In a further example, the batteries 405a-b may differ in one or more properties or states, such as capacity (e.g., 100 Ah versus 50 Ah) or output resistance as a result of different numbers of past charge-discharge cycles or battery chemistries. In the case of different capacities, a lower-capacity battery may have a lower output resistance, meaning that it may discharge faster than a higher-capacity battery under the same load. To address this problem, a controller at the lower-capacity battery may control a lower bypass current to discharge the battery at a slower rate. The higher-capacity battery, in contrast, may be discharged at a full current or via a higher bypass current. As a result, the batteries may discharge at a comparable rate.

In the case of batteries having different measures of ageing (e.g., charge/discharge cycles), a newer battery may have a lower output resistance than an older battery. To detect and compensate for this difference, the controllers 420*a-b* may measure the output current of each battery 405*a-b*, measure and communicate impedance of the batteries, and may retrieve reference information about the batteries (e.g., model number, date of manufacture, number of charge/discharge cycles). Based on some or all of the above information, one or more of the controllers 420*a-b* may control a bypass current to provide for discharging the batteries 405*a-b* at a comparable rate.

The controllers 420*a-b* may also control the respective bypass currents based on a received command signal indicating an operational profile, where the operational profile can indicate desired operational metrics for the entire power source 400 or an individual battery, such as a desired discharge current, discharge voltage, charging current, and/or a threshold battery temperature. The controllers 420*a-b* may also control the respective bypass currents based on a status signal, where the status signal indicates temperature, current, capacity, impedance and/or voltage of one or more batteries of the power source 400.

To communicate such operational profiles or status signals among the controllers 420*a-b*, the control circuits 420*a-b* may be communicatively coupled to one another via a data bus (e.g., a CAN or J1939 bus). The control circuits 420*a-b* may also communicate by injecting perturbation signals into the bypass current that can be detected by another of the control circuits. For example, the controller 420*a* may inject a perturbation signal that alters its bypass current in a manner indicating impedance of the battery 405*a*. This perturbation signal can then be measured by the controller 420*b* to determine the impedance of the battery 405*a*. Example operations using perturbation signals are descried in further detail below. The controller 420*b* may also calculate impedance of the battery based on a change in voltage and/or current at a power bus terminal.

In a further example, the control circuits 420*a-b* may communicate with one another to exchange information about each of the batteries 405*a-b* and, based on that information, determine charge and/or discharge currents for each of the batteries 405*a-b* to be enforced via the bypass circuits 430*a-b*. For example, the control circuits 420*a-b* may communicate with one another to exchange some or all of the following information:

1) Manufacturer part number (e.g., SAFT, Bren-Tronics, A123, Panasonics, etc). The controllers can fetch a database for the part number and/or model either from a local database or from the communication bus.
2) A data code from which battery ageing related to time can be derived.
3) Usage history: The stress the battery has endured during its usage.
4) A battery charging and discharging real-time model: This model can be used to calculate the stress during the charging and discharging based on the battery or battery cell voltage, current and temperature. For example, the battery cell temperature or the derived temperature stress can be used in this model to show that, with existing current parameters, the battery will lose 5% of its capacity in the next 10 cycles.
5) Battery capacity, SOC, and state-of-health: This is used to be compared with other batteries. For example, if battery A has half of battery B's capacity, the expected current of A is around half of that of battery B with other factors being equal.

Items (2) and (3) may be entered into the model/database of (1) to estimate the battery ageing. As a result, the ages of the different battery can be compared accordingly. For example, based on the data code and history usage, the controller determines that the battery has a given number of cycles left within its lifespan.

Therefore, using (1), (2) and (3), a battery's age may be calculated. For example, batteries 405*a* and 405*b* are configured in parallel, it is desired that both batteries reach the end of life at the same time. Provided that battery 405*a* has 250 cycles left and battery 405*b* has 500 cycles left, then the stress reference for battery 405*a* should be twice of that of battery 405*b*.

Item (4) can be used to provide stress feedback. Based on existing current, voltage and corresponding temperature, the ageing rate of the battery can be calculated. The stress reference from (1)(2)(3) and stress feedback (4) can be compared, and the error will be fed into a control algorithm to control the current. The control algorithm can factor in the items in (5), and the controllers 420*a-b* can control the current accordingly. Under certain load conditions or charging conditions (e.g., a demand for maximum current), such control may not be permitted. In such a case, the controller will control the current when permitted.

Figure 5:
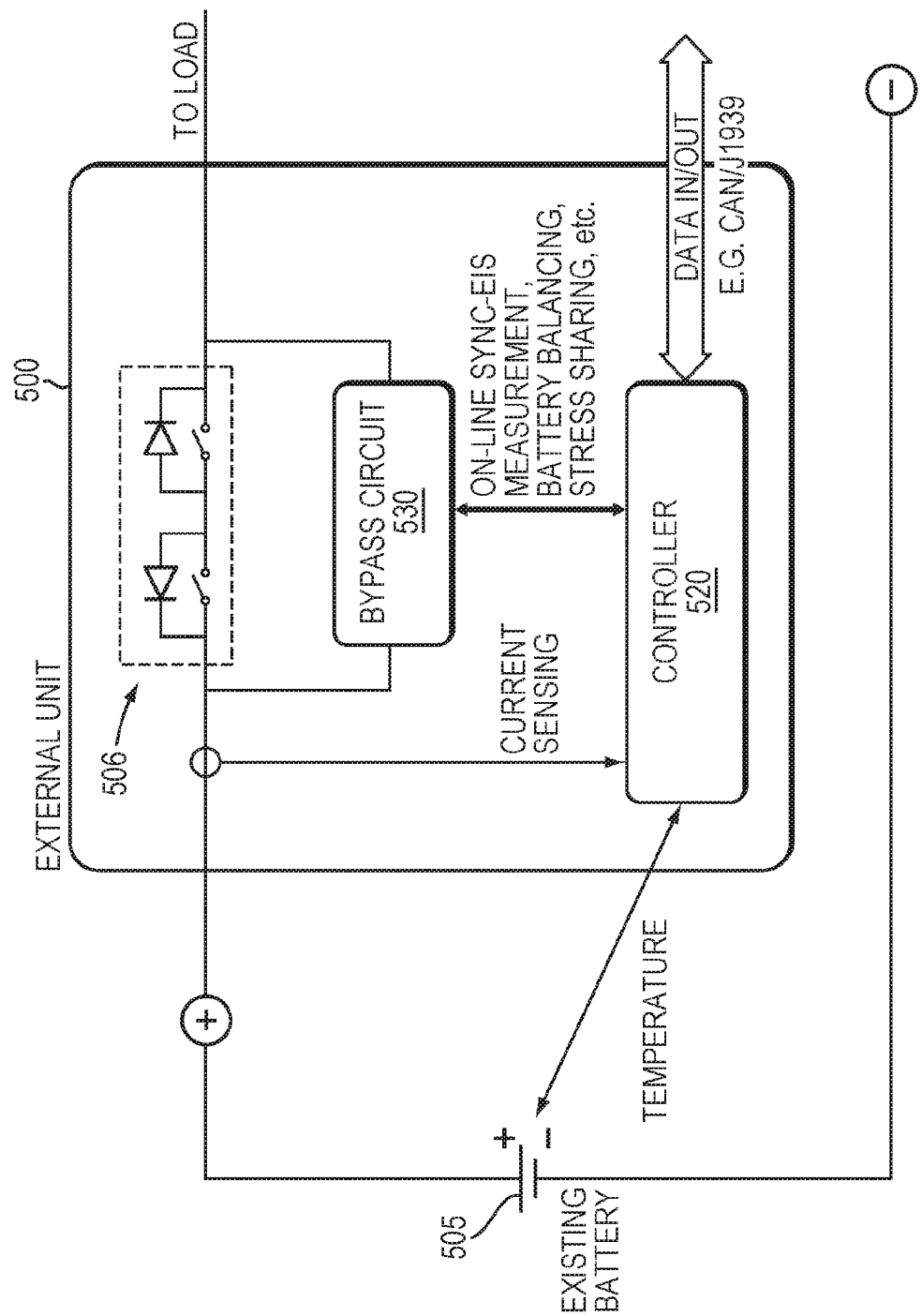
FIG. 5 illustrates a device for controlling a battery current in one embodiment.

FIG. 5 illustrates a device 500 for controlling a battery current in a further embodiment. The device 500 may be implemented as an external unit for connection with an existing battery 505 (e.g., battery cell or multi-cell battery pack). The device 500 may include some or all features of the control circuits 310, 410*a-b* described above, including a controller 520 and a bypass circuit 530. The device 500 may also include a load switch 506 operated by the controller 520 according to a determination on whether to direct a "full" current, a controlled bypass current, or no current. The battery 505 may include an integrated load switch (not shown) that cannot be bypassed by the device. In such a case, the device 500 may pass a bypass or full current when the integrated switch is on. The device 500 may control the parameters of the bypass current as in the embodiments described above. In particular, the controller 520 may detect temperature of the battery 505 via a sensor communicatively coupled to the controller, detect current through the battery terminal via a current sensor, detect voltage across the battery 505, calculate impedance of the battery 505 based on the voltage and current, calculate impedance of other batteries, and/or receive information about other batteries via a data bus. Based on some or all of the above information, the controller 520 may control the bypass current to perform battery balancing, stress reduction, temperature reduction, or other functions described herein.

Figure 6:
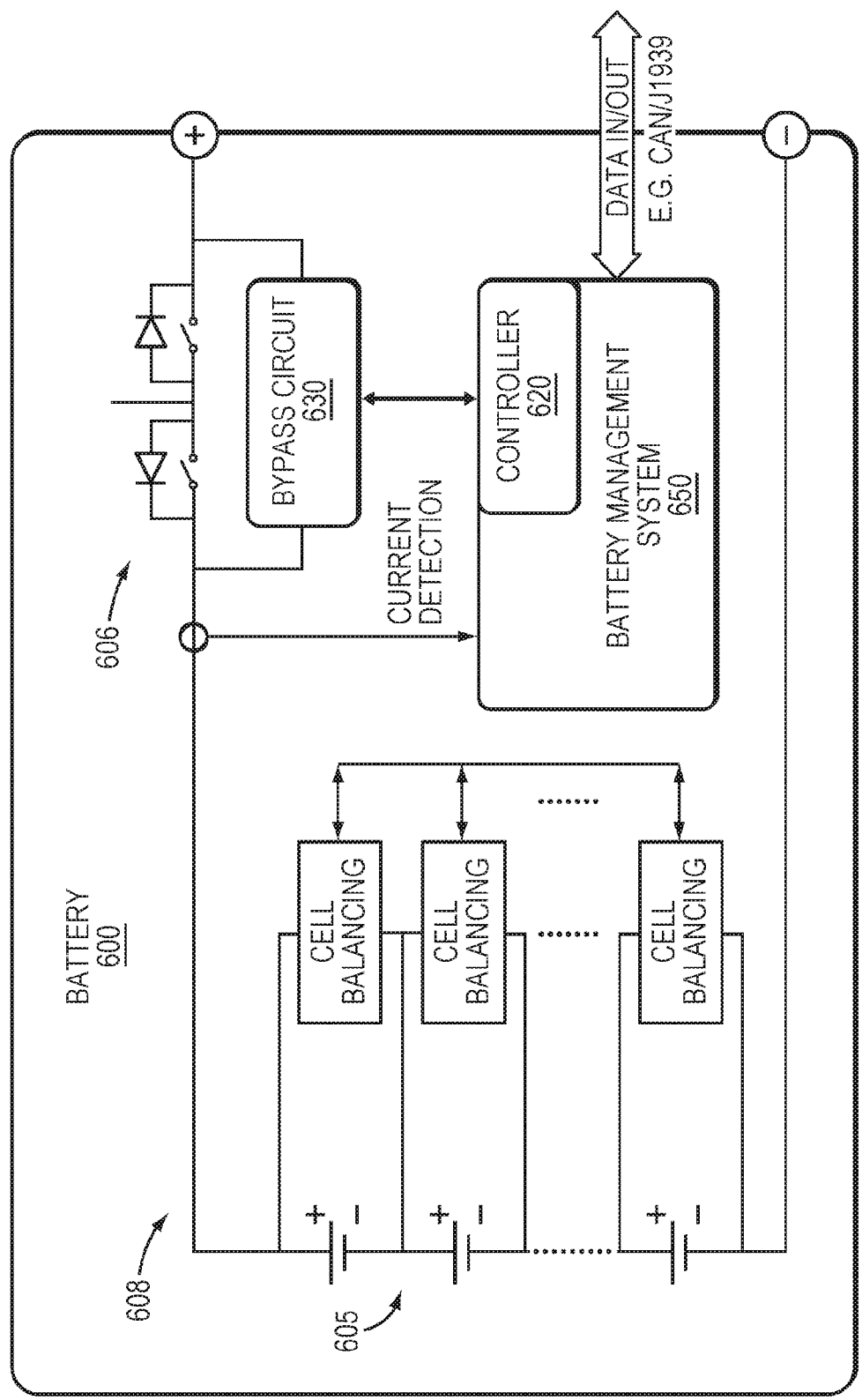
FIG. 6 illustrates a battery in one embodiment.

FIG. 6 illustrates a battery 600 in one embodiment. The battery 600 may be implemented as a battery pack such as a 6T battery, and includes a plurality of battery cells 605 connected in series to an output terminal pair, as well as a plurality of cell balancing circuits 608 each connected in parallel to a respective one of the battery cells 605. A load switch 606 is connected between the batteries 605 and the output terminal, and provides binary (on/off) control of the charge/discharge current of the battery 100. A BMS 650 enables and disables the load switch 606 to control charging and discharging of the battery 600.

A controller 620 and a bypass circuit 630 may include some or all features of the control circuits 310, 410*a-b* described above. However, the controller 620 (or functionality thereof) may be incorporated into the BMS 650. Thus, in addition to performing battery management functions such as controlling the load switch 606 and the cell balancing circuits 608, the BMS 650 (via the controller 620) may also control the bypass circuit 630 to perform one or more of the bypass operations as described above.

Figure 7:
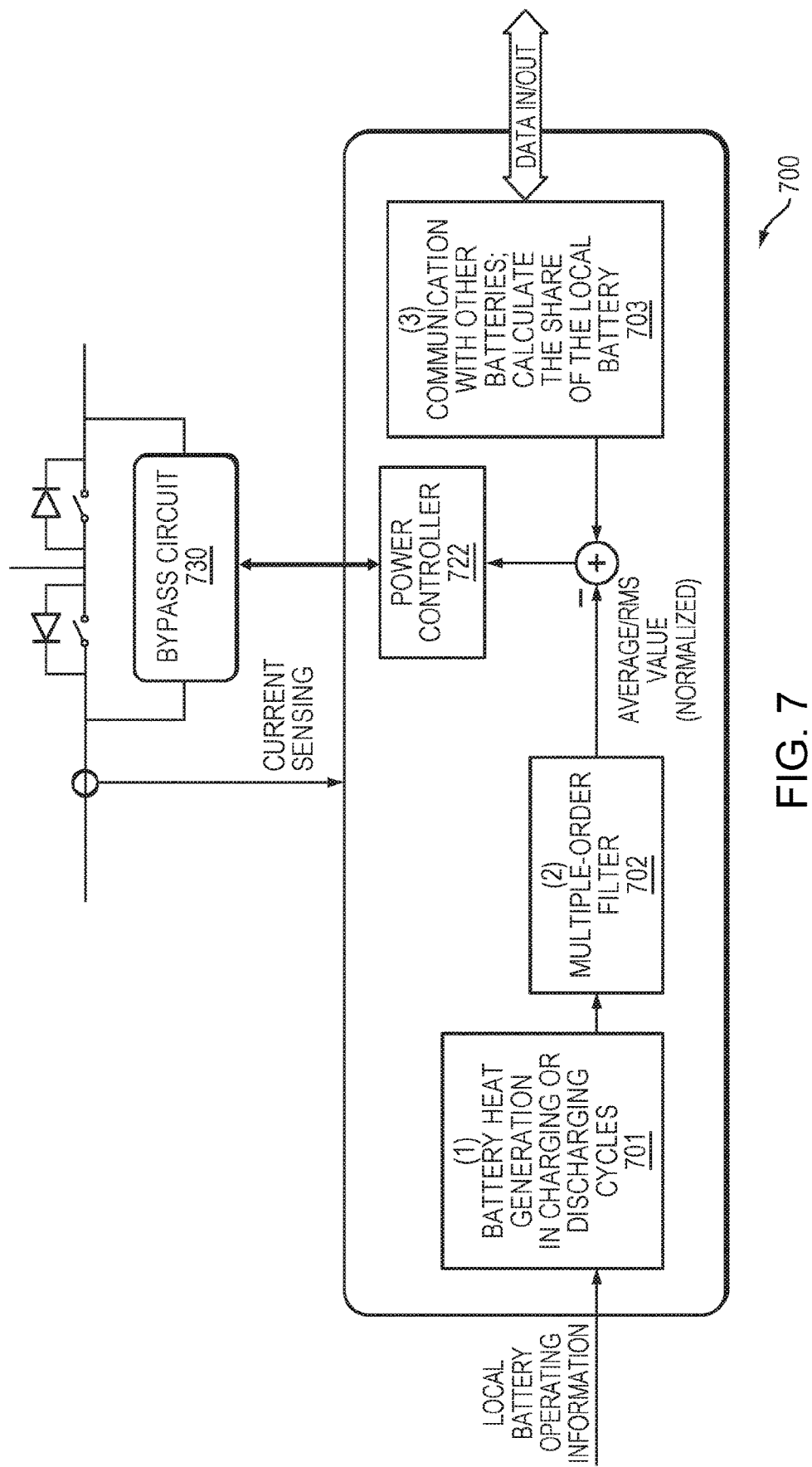
FIG. 7 is a flow diagram of a control process in one embodiment.

FIG. 7 is a flow diagram 700 illustrating an example process carried out by a controller 720 to determine parameters of a bypass current and control a bypass circuit 730 accordingly. One control strategy is to reduce the temperature stress the battery encounters during battery charging and charging by following a control structure.

The battery temperature affects its lifespan and performance significantly. For example, lithium-ion battery often achieves its best performance and longest life time at a temperature of ~20 C. Too high or too low a battery temperature will result in detrimental effects to its output energy, operating time and life. Meanwhile, during charging and discharging, a battery will generate heat. The heat generated is related to operating current and state-of-charge (i.e., how full the battery is). In general, the heat generated increases when charging/discharging current increases. Further, the relationship between the current and the generated heat is a non-linear process and more than proportional. For example, a double of output current will result in substantially more than twice the generated heat. Therefore, to reduce heat and resulting thermal stress, the operation current can be kept low and current proportionally distributed among batteries.

Further, a battery generally has a substantial thermal mass. That is, when heated, the battery will take a long time to warm up. Although the exact time constant depends on battery's design, usually it is at the order of minutes to tens of minutes. Therefore, when heat is generated, it takes a substantial amount of time (e.g. 30 min.) for the battery temperature to rise to its equilibrium. Further, when a battery has been warmed up, it takes a long time for the battery to cool down even the heat is removed. During the cooling period, the battery still sees high temperature, which continues degrading the battery. Moreover, a battery may undergo a greater and faster temperature rise in response to a greater charge or discharge current.

The flow diagram 700 illustrates a control process to reduce the temperature stress the battery experiences during battery charging and charging. At block 701, the controller 720 may calculate the battery heat generation during charging, discharging or continuous cycles of charging and discharging. Different batteries may have different heat generation model, and the specific model can be known from battery vendor or from analysis. At block 702, the controller 720 may simulate the battery thermal mass (emulating the slow temperature change) as a multiple-order filter to reflect the thermal stress at the time domain. The block 702 output may be average temperature stress for a pre-defined period of time or RMS value of the temperature stress for a pre-defined period of time. Further, the calculated result can be normalized with the stress value calculated at a pre-defined operation condition (e.g. 1 C discharging and/or charging) so that different batteries can be compared.

Through blocks 701 and 702, the controller 720 may calculate the thermal stress on the battery. This stress may also be determined from the temperature reading from the battery. However, it may be more effective to set the battery thermal stress model based on local battery information to represent the thermal effects on battery because the temperature reading might not correlate to battery thermal stress closely. At block 703, the controller 720 may receive stress information from other controllers and may calculate how much stress the local battery should have as a share of the total stress. Based on the calculations at blocks 701-703, a power controller 722 may then control the bypass circuit 730 to direct a bypass current having corresponding parameters.

In an example calculation at block 701, a signal correlated to the heat may be calculated as:

$$Heat = (V_{o,cal} - V_{out}) * I_{out} + I_{out}^2 * R_{out} + delatH$$

Where Vo,cal is the calculated battery open loop voltage, Vout is the battery voltage under the load condition, Rout is the battery internal resistive component, and deltaH is other battery-related heat generation related to specific battery.

At block 702, a multi-order or a first-order filter (1/(TcS+1)) may be used to simulate the thermal stress with first order approximation. Not shown here is the average and RMS value calculation for a pre-defined time. The calculated result can be normalized. At block 703, the normalized values can be shared among batteries. Further, historical information of the battery history, the battery life form battery vendors (e.g. as curves, a chart and/or table), and real time measurement such as electrochemical impedance spectroscopy (EIS) or impedance, current can be used for setting the reference stress, so the power controller can take control actions.

The power controller 722 may regulate the local stress to match the reference. This process may not be real-time control, and may carry out the following control rules: (1) Try to reduce thermal stress at the beginning of the operation because any temperature rise at the early stage will affect late operation due to the big thermal mass. (2) Load predictions will be used to predict the load condition. (3) If used, try to keep the power stage in buck mode to improve overall performance.

Figure 8:
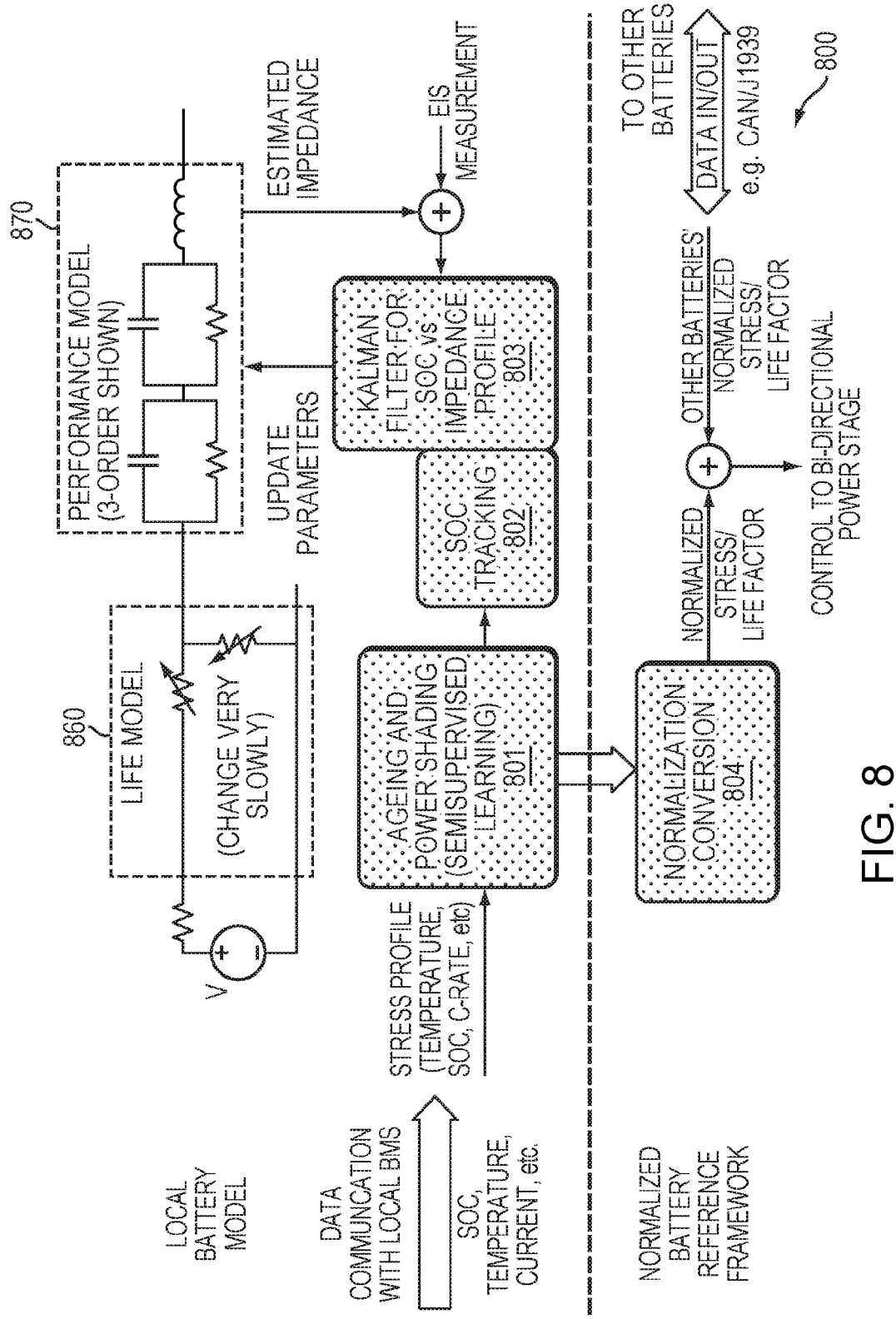
FIG. 8 is a flow diagram of a control process in a further embodiment.

FIG. 8 is a flow diagram illustrating a process 800 of determining a bypass current in a further embodiment. The process 800 may be implemented by a controller described above, and utilizes a battery model to determine the bypass current, where a life model 860 and a performance model 870 are components of the battery model. The life model 860 represents the remaining life time of a battery. As the battery ages, it may not be capable of charging or discharging as specified like a new one. Further, its internal power loss will grow during operation. Accordingly, the life model 860 will include lossy elements as part of a "life time" indicator, and it changes according to an ageing estimation. The battery performance model 870 is used to simulate the internal chemical characteristics of the battery. Therefore, this model can predicate operating parameters such as voltage supplied to the load when a certain type of load is connected. One of the important performance parameters is state of charge (SOC), which indicates how much charge, or energy can be stored in the battery.

At block 801, the controller may performs two jobs: 1) continuously refine the life mode 860; and 2) provide a current stress sensing result for determining the charging/discharging control value. Here, the controller may accept the real-time operating data, including SOC, temperature, discharging/charging rate from the battery. Based on the previously established life model, the controller can generate real-time stress information. The life model parameter may be continuously updated along with usage of battery.

At block 802, the controller tracks the battery SOC changes with charging and discharging operations, thereby providing real-time SOC information.

At block 803, the controller may apply a Kalman filter, Butterworth filter, or any other filter to refine the performance model based on SOC and EIS. Impedance (which varies with SOC) can be estimated from the performance model 870 using SOC information. If the estimated impedance is different from actual measured impedance, the controller may update the model to reflect the difference.

At block 804, the controller may perform a normalization conversion. Individual batteries can exhibit substantial differences in characteristics such as chemistry and volume, resulting in different SOC and impedance. Normalization converts the measured values to values suitable for comparison across different batteries. For example, for a 60 Ah battery, 1 C rate is 60 A. For a 500 Ah battery, 1 C rate is 500 A. If we only compare 60 A vs. 500 A, it may indicate 500 A is high stress. However, if we normalize the charging current by Ah, then both are equal to 1, which shows that the stresses are the same. After normalization, the stress factor can be used to compare with another battery's same normalized value. Based on this comparison, the controller can determine an appropriate bypass current and control a bypass circuit accordingly.

As described above with reference to FIG. 4, control circuits in example embodiments (e.g. control circuits 420a-b) may communicate by injecting perturbation signals into the bypass current that can be detected by another of the control circuits. For example, the controller 420a may inject a perturbation signal that alters its bypass current in a manner indicating impedance of the battery 405a. This perturbation signal can then be measured by the controller 420b to determine the impedance of the battery 405a. Further, when 420a-b are measuring impedance locally, in order to avoid distortion in the combined current of the system, the control circuits may inject perturbation signals that, when combined, cancel one another out.

Figure 9:
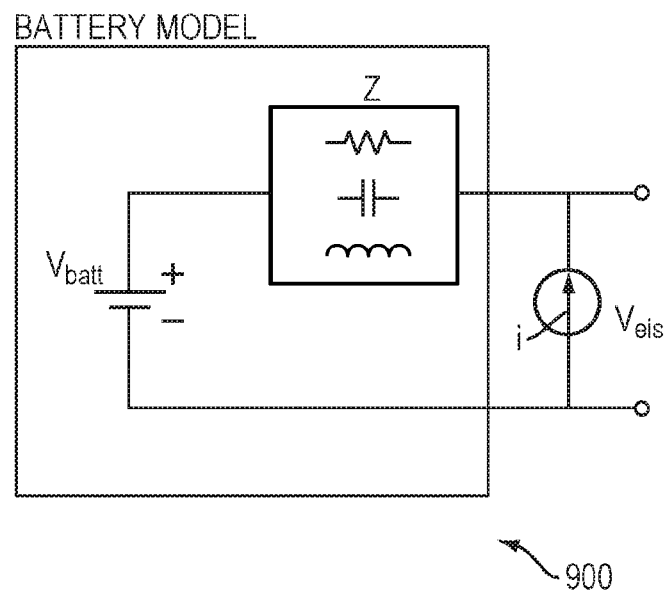
FIG. 9 is a diagram of a battery model.

FIG. 9 is a circuit diagram of a battery model 900 that may be referenced to calculate an appropriate perturbation signal. The battery can be simplified to model as an ideal DC voltage source Vbatt in series with an impedance Z. Z is formed by series/parallel connection of basic passive electrical elements such as resistors, capacitors and inductors. An EIS method can be used to measure this impedance Z. Because of the existence of capacitor and inductor, Z is a function of frequency. Thus, an EIS process may scan the impedance across the range of frequencies that of interests. Typically, it is from 0.01 Hz to 10 kHz. The result will form Z over frequency f as Z(f).

To achieve that, a current perturbation "i" is injected to the battery. "i" is a sinusoidal signal at a frequency of test. Alternatively, "i" may be a periodic signal that can be decomposed into its sinusoidal Fourier terms. Further, the perturbation can be from the load, and the perturbation injection is not needed. Because Vbatt is an ideal DC source, from sinusoidal signal at a frequency f above DC, it is virtually short. Thus the model at testing frequency f (f is higher than 0 Hz, or DC) is comparable to the model 900 with the omission/short of the battery.

Provided that the voltage across the battery is measured to obtain Veis, and focusing on the Veis value at this testing frequency, Z can be obtained as:

$$Z(f) = (\tilde{V}\text{-}eis(f))/(\tilde{i}(f))$$

Figure 10:
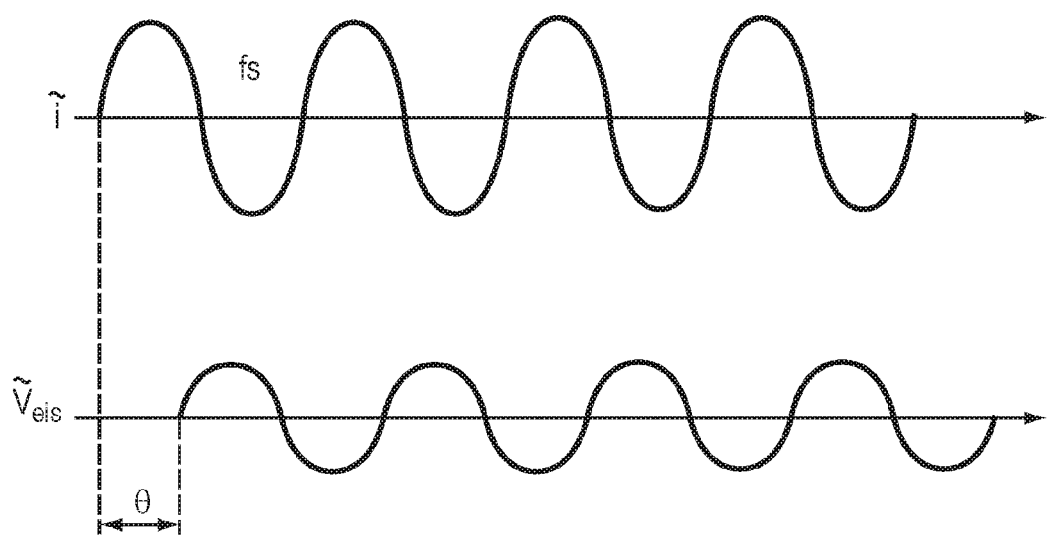
FIG. 10 is a timing diagram of a perturbation signal in one embodiment.

The "~" above the name indicates that it only refers to the signal content at the frequency of interest "f." An example waveform is shown in FIG. 10. Here, frequency is "f", "θ" is the phase-shift between the voltage and current at frequency f.

While example embodiments have been particularly shown and described, it will be understood by those skilled in the art that various changes in form and details may be made therein without departing from the scope of the embodiments encompassed by the appended claims.

What is claimed is:

1. A circuit comprising:
   a bypass circuit connected to a terminal of a battery and connected in parallel with a load switch, the bypass circuit configured to selectively direct a bypass current around the load switch; and
   a controller configured to: 1) in a first mode, control at least one parameter of the bypass current based on at least one reference value corresponding to thermal stress of the battery, the at least one reference value being based on a recorded usage history of charging currents and discharging currents of the battery over a period of time, and 2) in a second mode, control the bypass circuit to disable the bypass current.

2. The circuit of claim 1, wherein the bypass current is less than a current passed by the load switch in an on state.

3. The circuit of claim 1, wherein the load switch is off in the first mode, and wherein the load switch is on in the second mode.

4. The circuit of claim 1, wherein the controller, in the first mode, controls the bypass current based on a difference between the thermal stress of the battery and a thermal stress of at least one additional battery.

5. The circuit of claim 4, wherein the controller, in the first mode, controls the bypass circuit to convert a discharge current to an output current having a higher voltage and a lower current.

6. The circuit of claim 4, wherein the controller, in the first mode and during charging of the battery, lowers the bypass current in response to the thermal stress of the battery passing a threshold.

7. The circuit of claim 4, wherein the controller switches between the first and second modes based on an on or off state of the load switch.

8. The circuit of claim 4, wherein the controller controls the bypass current based on a received command signal indicating an operational profile, the operational profile indicating at least one of a discharge current, discharge voltage, charging current, and a threshold battery temperature.

9. The circuit of claim 4, wherein the controller controls the bypass current based on a status signal, the status signal indicating at least one of temperature, current, capacity, impedance and voltage at another battery.

10. The circuit of claim 4, wherein the controller is further configured to inject a perturbation signal into the bypass current, the perturbation signal altering the bypass current in a manner indicating impedance of the battery.

11. The circuit of claim 4, wherein the controller is further configured to calculate impedance of the battery based on a change in at least one of voltage and current at the terminal.

12. The circuit of claim 4, wherein the at least one parameter of the bypass current includes at least one of a magnitude and a frequency of the bypass current.

13. The circuit of claim 4, wherein the bypass circuit is connected to the terminal of the battery via at least one intermediary circuit elements.

14. The circuit of claim 4, wherein, in the second mode, the bypass circuit directs a leakage current around the load switch, the leakage current having a magnitude less than a magnitude of the bypass current.

15. The circuit of claim 4, wherein the controller is further configured to receive at least one of a detected current at the terminal, a detected voltage at the terminal, and a detected temperature of the battery.

16. The circuit of claim 4, wherein the controller is further configured to control the at least one parameter of the bypass current based on a battery cell chemistry of the battery.

17. The circuit of claim 1, wherein the bypass circuit includes a bidirectional converter configured to pass the bypass current.

18. The circuit of claim 17, wherein the bidirectional converter includes at least one of a buck-boost converter, a boost-buck converter, a buck converter, a boost converter, and a dual-active bridge (DAB) converter.

19. A battery system comprising:
a plurality of cells coupled to a first terminal and a second terminal;
a load switch coupled to the first terminal;
a bypass circuit coupled to the first terminal and in parallel with the load switch, the bypass circuit configured to direct a bypass current around the load switch; and
a controller configured to selectively enable the bypass current and control the bypass current based on at least one reference value corresponding to thermal stress of at least one of the plurality of cells, the at least one reference value being based on a recorded usage history of charging currents and discharging currents of the battery over a period of time.

20. The system of claim 19, further comprising a plurality of cell balancing circuits, each of the plurality of cell balancing circuits being coupled to a respective one of the plurality of cells and configured to selectively discharge the respective cell based on a command from the controller.

21. The battery system of claim 19, wherein the controller is further configured to: 1) in a first mode, control the bypass current based on at least one of a discharge current at the terminal, a charge current at the terminal, a voltage at the terminal, and a temperature of the battery, and 2) in a second mode, control the bypass circuit to disable the bypass current.

22. A battery management system comprising:
a first bypass circuit configured to be coupled to a terminal of a first battery and in parallel with a first load switch, the first bypass circuit configured to selectively direct a first bypass current around the first load switch;
a second bypass circuit configured to be coupled to a terminal of a second battery and in parallel with a second load switch, the second bypass circuit configured to selectively direct a second bypass current around the second load switch; and
a controller configured to selectively enable the first and second bypass currents based on a status of at least one of the first and second batteries and control at least one of the first and second bypass currents based on at least one reference value corresponding to thermal stress of at least one of the first and second batteries, the at least one reference value being based on a recorded usage history of charging currents and discharging currents of the battery over a period of time.

23. The system of claim 22, wherein the status includes at least one of a discharge current, a charge current, an output impedance, and a detected temperature.

24. The system of claim 22, wherein, during a discharge of the first and second batteries, the controller is configured to control the first bypass current based on a difference between detected output impedances of the first and second batteries.

25. The system of claim 22, wherein, during a discharge of the first and second batteries, the controller is configured to control the first bypass current based on a difference between detected temperatures of the first and second batteries.

26. The system of claim 22, wherein the controller selectively enables the first bypass current in response to an indication of a difference in capacity between the first and second batteries.

27. The system of claim 22, wherein the first and second bypass circuits are communicatively coupled to the controller via a controller area network (CAN) bus.

28. The system of claim 22, wherein the controller selectively enables the first bypass current based on information about at least one of the first and second batteries.

29. The system of claim 28, wherein the information includes at least one of a model number, cell chemical composition, a date of manufacture, and a number of charge and discharge cycles.

30. The system of claim 22, wherein the controller is further configured to inject respective perturbation signals into the first bypass current and second bypass current, the perturbation signals altering the first and second bypass currents in a manner indicating impedance of the first and second batteries.

31. The system of claim 30, wherein the controller controls the respective perturbation signals to cancel out one another at a combined battery output.

32. A circuit comprising:
a bypass circuit connected to a terminal of a battery and connected in parallel with a load switch, the bypass circuit configured to selectively direct a bypass current around the load switch; and
a controller configured to: 1) in a first mode, control at least one parameter of the bypass current based on at least one reference value corresponding to thermal stress of the battery, the at least one reference value being based on a recorded usage history of the battery over a period of time, and 2) in a second mode, control the bypass circuit to disable the bypass current
wherein the controller, in the first mode, determines the thermal stress of the battery based on a thermal stress model of the battery, the model simulating heat generated at the battery over the period of time and providing the at least one reference value.

* * * * *